United States Patent
Mattson et al.

[11] Patent Number: 5,937,205
[45] Date of Patent: Aug. 10, 1999

[54] DYNAMIC QUEUE PRIORITIZATION BY MODIFYING PRIORITY VALUE BASED ON QUEUE'S LEVEL AND SERVING LESS THAN A MAXIMUM NUMBER OF REQUESTS PER QUEUE

[75] Inventors: Richard Lewis Mattson, Pacific Grove; Jaishankar Moothedath Menon, San Jose, both of Calif.

[73] Assignee: International Business Machines Corporation, Armonk, N.Y.

[21] Appl. No.: 08/568,327

[22] Filed: Dec. 6, 1995

[51] Int. Cl.⁶ ............................................ G06F 13/18
[52] U.S. Cl. ..................... 395/826; 395/861; 395/670; 395/732
[58] Field of Search ...................... 395/296, 303, 395/860, 861, 670, 732, 826

[56] References Cited

U.S. PATENT DOCUMENTS

| | | | |
|---|---|---|---|
| 4,611,322 | 9/1986 | Larson et al. ............................ | 370/232 |
| 4,809,164 | 2/1989 | Fuller ...................................... | 395/861 |
| 5,140,682 | 8/1992 | Okura et al. ............................ | 395/457 |
| 5,504,894 | 4/1996 | Ferguson et al. ....................... | 395/602 |
| 5,519,701 | 5/1996 | Colmant .................................. | 370/412 |
| 5,623,668 | 4/1997 | Nieuwenhuizen ....................... | 395/670 |

FOREIGN PATENT DOCUMENTS

| | | |
|---|---|---|
| 63-37433 | 2/1988 | Japan . |
| 63-300326 | 12/1988 | Japan . |

*Primary Examiner*—Dung C. Dinh
*Attorney, Agent, or Firm*—Paik Saber

[57] ABSTRACT

In a data processing system having a plurality of queues for prioritizing I/O requests to a storage device, the priority of the queues for servicing is dynamically adjustable as opposed to each queue having a fixed priority. Dynamically adjusting the priority of a queue allows the priority of a queue with "stuck" requests to be raised so the "stuck" requests can be serviced very quickly.

5 Claims, 14 Drawing Sheets

| | C0 | | C1 | | C2 | | C3 | |
|---|---|---|---|---|---|---|---|---|
| | QUEUE # | NEXT ROW # | QUEUE # | NEXT ROW # | QUEUE # | NEXT ROW # | QUEUE # | NEXT ROW # |
| R0 | — | 1 | — | 1 | — | 1 | — | 1 |
| R1 | Q0 | 1 | Q1 | 1 | Q2 | 1 | Q3 | 1 |
| R2 | | | | | | | | |
| ⋮ | ⋮ | | ⋮ | | ⋮ | | ⋮ | |
| Rn | | | | | | | | |

| | DESCRIPTION | PRIORITY LEVEL | NO. OF REQUEST IN EACH QUEUE |
|---|---|---|---|
| 358 | Q0 | 0 | 0 |
| 360 | Q1 | 1 | 0 |
| 362 | Q2 | 2 | 0 |
| 364 | Q3 | 3 | 0 |
| 366 | CURRENT PRIORITY LEVEL | −1 | — |

|  | C0 | | C1 | | C2 | | C3 | |
|---|---|---|---|---|---|---|---|---|
|  | QUEUE # | NEXT ROW # | QUEUE # | NEXT ROW # | QUEUE # | NEXT ROW # | QUEUE # | NEXT ROW # |
| R0 | — | 1 | — | 1 | — | 2 | — | 1 |
| R1 | NULL | 1 | Q1 | 1 | Q2 | 2 | Q3 | 1 |
| R2 |  |  |  |  | Q0 | 1 |  |  |
| ⋮ | ⋮ | ⋮ | ⋮ | ⋮ | ⋮ | ⋮ | ⋮ | ⋮ |
| Rn |  |  |  |  |  |  |  |  |

| DESCRIPTION | PRIORITY LEVEL | NO. OF REQUEST IN EACH QUEUE |
|---|---|---|
| Q0 | 2 | 15 |
| Q1 | 1 | 5 |
| Q2 | 2 | 0 |
| Q3 | 3 | 0 |
| CURRENT PRIORITY LEVEL | 1 | — |

| | C0 | | C1 | | C2 | | C3 | |
|---|---|---|---|---|---|---|---|---|
| | QUEUE # | NEXT ROW # | QUEUE # | NEXT ROW # | QUEUE # | NEXT ROW # | QUEUE # | NEXT ROW # |
| R0 | — | 1 | — | 1 | — | 2 | — | 1 |
| R1 | NULL | 1 | NULL | 1 | Q2 | 2 | Q3 | 1 |
| R2 | — | — | — | — | Q1 | 3 | — | — |
| R3 | — | — | — | — | Q0 | 4 | — | — |
| R4 | | | | | Q1 | 5 | | |
| R5 | | | | | Q1 | 1 | | |
| Rn | | | | | | | | |

| DESCRIPTION | PRIORITY LEVEL | NO. OF REQUEST IN EACH QUEUE |
|---|---|---|
| Q0 | 2 | 15 |
| Q1 | 1 | 15 |
| Q2 | 3 | 4 |
| Q3 | 2 | 0 |
| CURRENT PRIORITY LEVEL | 2 | — |

DYNAMIC QUEUE PRIORITIZATION BY MODIFYING PRIORITY VALUE BASED ON QUEUE'S LEVEL AND SERVING LESS THAN A MAXIMUM NUMBER OF REQUESTS PER QUEUE

BACKGROUND OF THE INVENTION

1. Technical Field

This invention relates to a data processing system having multiple queues for managing requests. Specifically, this invention relates to a method and means for dynamically managing queue prioritization in a data processing system having a storage subsystem.

2. Description of the Background Art

In a data processing system (system) 100 having a host system (CPU) and a storage subsystem where the storage subsystem comprises a plurality of storage devices (devices) and a storage controller, there is a crucial list for listing the current status of all outstanding requests for access to any given storage device. (FIG. 1). This list is generally referred to as a job queue, task queue, ready list, work list or simply queue. The requests (also referred to as "jobs") in each queue are usually serviced on a first-in, first-out (FIFO) basis. Moreover, to provide the requests for access to a storage device with different priorities, several queues having different priorities are usually maintained at the storage subsystem for each device. For example, in order to process access requests to a storage device, the storage subsystem may maintain four queues for each device where by design $Q_0$ is a queue of the lowest priority, $Q_1$ is a queue of a low priority, $Q_2$ is a queue of medium priority and $Q_3$ is a queue of the highest priority. The four queues may be maintained either at the storage controller or at each device.

In general, the storage controller polls the queues for processing requests. If there are pending requests in $Q_3$, the controller processes the next request from $Q_3$ since that is the queue with the highest priority. If there are no pending requests in $Q_3$, the storage controller then processes the next request from $Q_2$ since $Q_2$ is the next highest priority queue. However, if $Q_3$ receives a request for access to a device before the request from $Q_2$ has been completed, the processing of the request from $Q_2$ is generally interrupted, the unfinished request is stored back in $Q_2$, and the request from $Q_3$ is then processed.

In a similar manner, if there are no pending requests in $Q_3$ and $Q_2$, the storage controller then processes the next request from $Q_1$ since $Q_1$ would be the next highest priority queue. However, if either $Q_3$ or $Q_2$ receives a request for access to a device before the request from $Q_1$ has been completed, the processing of the request from $Q_1$ is generally interrupted, the unfinished request is stored back in $Q_1$, and the request from $Q_3$ or $Q_2$ is then processed.

Using this method, the requests with high priorities are processed very quickly, but requests from lower priority queues can get "stuck" for a long time because requests from higher priority queues are continuously interrupting the processing of the requests from lower priority queues. The on going interruptions of the processing of the requests from lower priority queues result in substantial waste of system resources.

In general, in order to deal with this serious problem, a data processing system has to have means for detecting stuck requests and removing them from lower priority queues to higher priority queues so they can be processed. This approach, which is the prevalent method of dealing with stuck requests at the present time requires a complicated controller design, queue implementations and system coding to be able to detect stuck requests and moving them from lower priority queues to higher priority queues in order to execute them. Therefore, managing stuck requests and minimizing the number of requests interrupts in any data processing system having multiple queues is of paramount importance.

Therefore, there is a need for an invention that allows processing stuck requests as efficiently as possible without depleting valuable system resources in the process of moving them from the lower priority queues to the higher priority queues in order to process them.

SUMMARY OF THE INVENTION

It is an object of the present invention to improve queue management in a data processing system having multiple priority queues.

It is another object of the present invention to minimize depletion of system resources in detecting and processing stuck requests.

It is yet another object of the present invention to minimize the number of request interrupts in a data processing system having multiple priority queues.

It is still another object of the present invention to improve queue management in a data processing system where multiple queues are maintained at the storage controller of the storage subsystem.

It is yet another object of the present invention to improve queue management in a data processing system where multiple queues are maintained at each storage device in the storage subsystem.

It is still another object of the present invention to process stuck requests without moving the request from lower priority queues to higher priority queues.

Toward this end and in accordance with the present invention, in a data processing system having multiple queues, a method and means are disclosed for managing the queues where the priority of queues are no longer fixed and can be changed dynamically while the system is running. Dynamic adjustment of a queue priority allows the priority of a lower priority queue (or queues) containing requests that are constantly being interrupted to be raised so those stuck requests can be processed quickly without the need for actually moving the stuck requests from the lower priority queue to a higher priority queue.

In one embodiment of the present invention where the storage subsystem comprises a storage controller and a plurality of storage devices, the queues for each storage device are maintained and their priorities are dynamically managed at the storage controller. Furthermore, queue related information such as current priority of each queue, current priority level for queue servicing, the number of jobs (requests) in each queue, and the queue from which requests are currently being serviced are also maintained at the storage controller.

The queue related information may be maintained in the form of a set of tables referred to as queue priority and service table (QPS table) and device controller status table (DCS table). The tables are generally stored on a high speed semiconductor storage medium, accessible by the storage controller processor, for fast access. The storage controller utilizes these two tables in determining, among other things, which queue is being serviced at the present time and which queue should be serviced next. The default QPS table is provided by the host system.

During normal operation, if the number of requests (also referred to as number of pending requests) in a given queue, $Q_1$, exceeds a predetermined maximum request count (upper threshold or simply "maximum count") established for that queue, the host system provides the storage controller with an updated QPS table where the priority of $Q_1$ is increased, thus allowing the requests in $Q_1$ to get processed faster. Once the number of requests in $Q_1$ falls below a predetermined minimum request count (lower threshold or simply "minimum count"), the host processor then provides a new QPS table to the storage controller where the priority of $Q_1$ is generally set back to its original default value.

Similarly, during normal operation, if the number of requests in several queues, $Q_i$, $Q_j$, $Q_k$ exceeds their predetermined thresholds, the host processor may provide the storage controller with an updated QPS Table where the priority of all these queues are increased, thus allowing faster execution of the requests in these queues.

Again, once the number of requests in $Q_i$, $Q_j$ and $Q_k$ fall below the respective predetermined minimum request count established for each queue, the host processor will provide a new QPS table to the storage controller where the priority of all these queues are generally set to their initial values.

In another embodiment of the present invention where the storage subsystem comprises a storage controller and a plurality of storage devices where each device has its own processor and memory, the queues for each device are maintained and their priorities are dynamically managed at each device itself. Furthermore, queue related information such as current priority of each queue, current priority level for queue servicing, the number of jobs (requests) in each queue, and the queue from which requests are currently being serviced are also maintained at the device. This information may be maintained in the form of a queue priority and service table (QPS table) and a device controller status table (DCS table). The default QPS Table is initially provided by the storage controller to each storage device. Each storage device then utilizes its own set of queues in managing the request issued by the host system and directed to that specific storage device by the storage controller.

Again, if the number of requests in a given queue, $Q_i$, of a given storage device, $SD_n$, exceeds a predetermined threshold, then the storage controller provides the $SD_n$ with an updated $QPS_n$ table where the priority of $Q_i$ is increased, thus allowing faster execution of the requests in $Q_i$. Once the number of requests in $Q_i$ fall below a predetermined count, then the storage controller provides a new $QPS_n$ table where the priority of $Q_i$ in $SD_n$ is set back to its original value.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a depiction of a default QPS table;

FIG. 3B is a depiction of a default DCS table;

FIG. 4A is a depiction of a QPS table where the priority of queues have been modified;

FIG. 4B is a depiction of a DCS table related to the QPS table of FIG. 4A;

FIG. 5A is a depiction of a modified QPS table where the priority of queues have been changed;

FIG. 5B is a depiction of a DCS table associated with the table shown in FIG. 5A;

In this specification, similar numerals refer to similar elements throughout the figures.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 1:
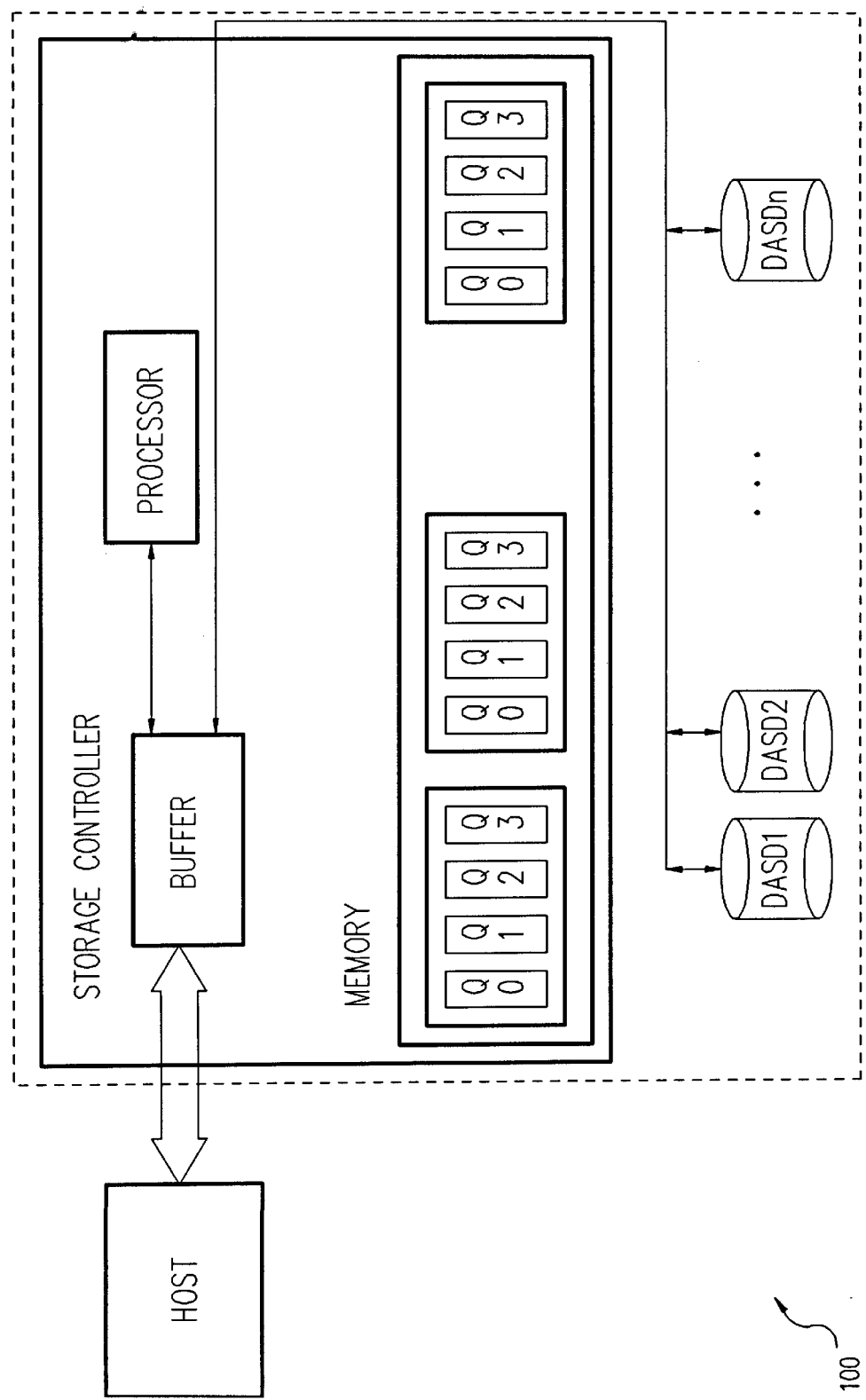
FIG. 1 is a depiction of a data processing system having a host system in communication with a storage subsystem having multiple queues.
Figure 2:
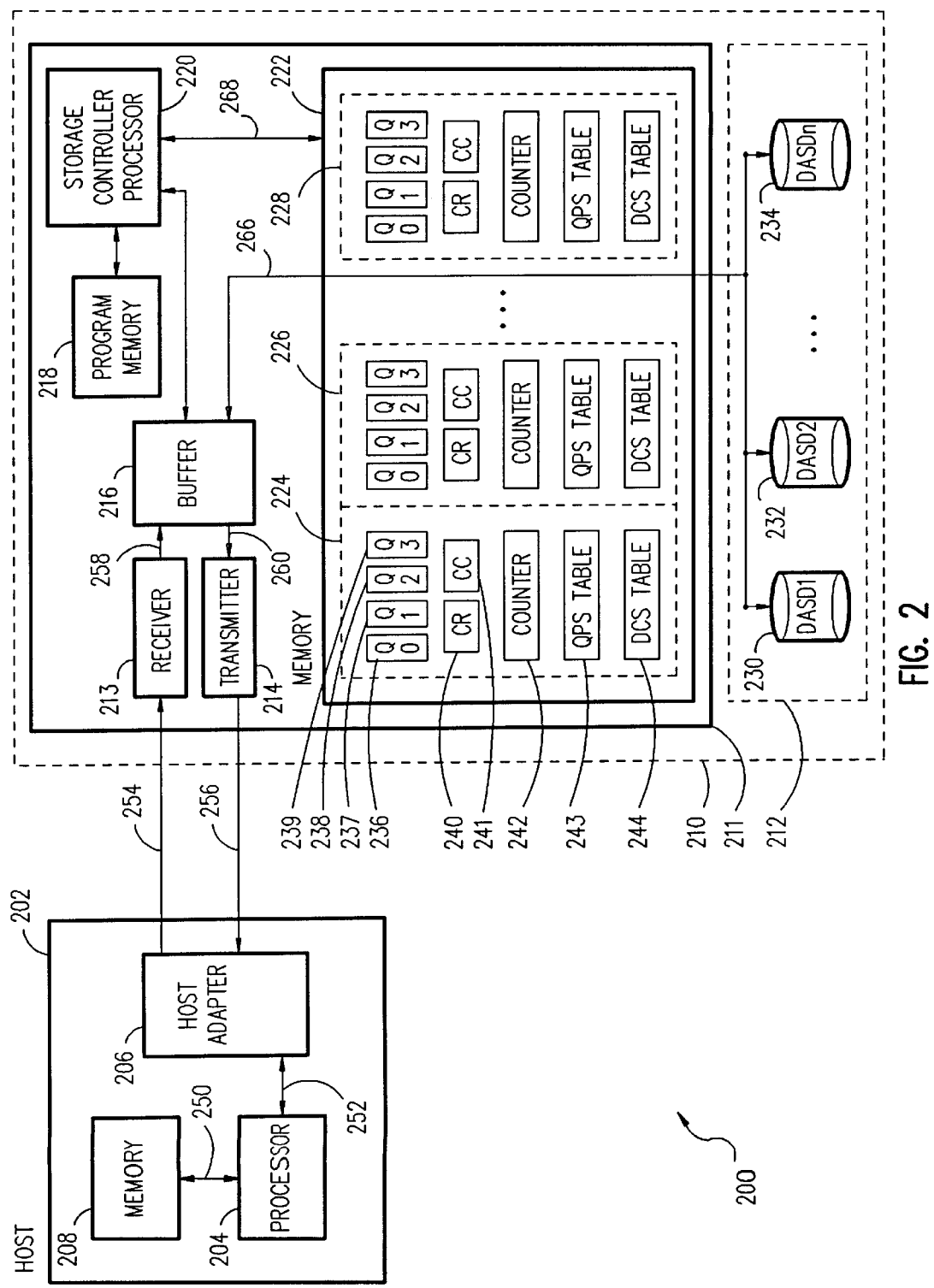
FIG. 2 is a depiction of a preferred embodiment of the present invention.

Referring to FIG. 2, there is shown a schematic diagram of a data processing system according to the preferred embodiment of the present invention. The data processing system 200 comprises a host system (sender) 202 in communication with a storage subsystem 210 over communication channels 254 and 256. Host 202 further comprises a host processor 204 in communication with memory unit 208 over link 250 and in communication with host adapter 206 over link 252. Memory unit 208 typically includes a high speed memory such as DRAM which stores, among other things, maximum and minimum request values of the number of outstanding requests for each queue. Host adapter 206 provides channel interface between host processor 204 and storage subsystem 210.

Storage subsystem 210 comprises a storage controller (receiver) 211 in communication with a plurality of storage devices 212 over communication channel 266. In the preferred embodiment of the present invention, the storage devices are magnetic devices of the type known as direct access storage devices (DASD). Storage controller 211 comprises a receiver 213 and transmitter 214 for communicating with host system 202. The receiver 213 receives data and instructions (commands, request) issued by host 202 over link 254 and transmitter 214 communicates data and interrupts to host system 202 via link 256. Storage controller 211 further comprises a buffer for storing the data received from the host or the data that is about to be sent to the host. Buffer 216 communicates with receiver 213, transmitter 214, storage controller processor 220, and storage devices 212 via communication links 258, 260, 262, and 266, respectively. Storage controller 211 also includes a storage controller processor (controller processor) 220 which controls the data communication handling between storage devices 212 and host 202. It also manages queues and queues servicing for each device 230. Storage controller 211 further comprises a memory 222 where in the preferred embodiment of the present invention, memory unit 222 is a high speed semiconductor memory. Memory 222 stores the queues associated with each storage device, in addition to other relevant information in managing those queues such as a QPS table and a DCS table.

For example, memory unit 222 includes queue management information 224 for managing requests for access to storage device 230 (DASD1) and queue management information 228 for managing requests for access to storage device 234 (DASDn). Queue management information 224 comprises queues 236, 237, 238 and 239 and queue priority and service table (QPS table) 243 and device controller and status table (DCS table) 244. QPS table 243 includes information such as queue priorities and how the requests from queues 236, 237, 238, and 239 should be serviced according to the entries in QPS table 243. DCS table 244 includes information such as priority level of each queue, current priority level at which queues 236, 237, 238, and 239 are being serviced (also referred to as "current priority level for queue servicing"), and the number of requests currently pending in each of the queues. Queue management information 224 also includes queues' jobs completion counter (QJCC) 242 which keeps track of whether all the requests from the queues having same priority have been serviced. So, if the content of queues' job completion counter 242 is equal to the number of queues having same priority, that means that all the requests from the queues having the same priority have been serviced. Queue management information 224 also includes registers 240 (current row (CR)) and 241 (current column (CC)) which their contents together identify an entry in QPS table 243 which includes the queue currently being serviced.

FIG. 3A is a depiction of a default queue priority and service (QPS) table 300 sent by host system 202 to storage controller 211. QPS Table 300 is divided into a plurality of columns and rows. The number of columns are dictated by the number of queue priorities available in system 200. In the preferred embodiment of the present invention, QPS table 300 comprises four columns, C3, C2, C1, and C0. Column 3 (C3) is labeled as the highest priority column so the queues in C3 have the highest priority for servicing; column 2 (C2) is labeled as medium priority column so the queues that are in C2 have medium priority for servicing; column 1 (C1) is labeled as low priority column; and column 0 (C0) is labeled as the lowest priority column so the queues in C0 have the lowest priority for servicing.

QPS table 300 further includes a number of rows, R0 (row 0) through Rn (row n) where the number of rows is at least equal to the number of columns plus 1. QPS table 300 also includes several entries where each entry in the table is identified by a notation which includes a reference to the row and the column in which the entry is stored. For example, entry 330 is identified by the notation R1C3 which means that entry 330 is at the intersection of row 1 and column 3. Entry 340 is identified by R1C2 which means that entry 340 is at the intersection of row 1 and column 2. Each entry in QPS table 300, except for entries in row 0 (R0), has two sub-fields, a left sub-field labeled as "queue number" and a right sub-field labeled as "next row number". The queue number in each entry identifies the queue that should be serviced if that entry is selected. The next row number identifies the next entry that should be serviced under the current priority (current column). In QPS table 300, R0 is a special row which its entries only include right sub-field "next row number". Next row number in row 0 is used by storage controller 211 to determine which entry in a column should be serviced first if the entries in that column are selected for servicing.

For example, entry at R1C3 comprises a queue number $Q_3$ and a next row number 1 which means that $Q_3$ is the queue that should be serviced immediately if R1C3 entry is selected. Row 1 means that the current entry should be serviced again, that is, continue executing all the requests from $Q_3$ before executing requests from any other queues. Once all the jobs in $Q_3$ are carried out, then the jobs in the medium priority queues will be handled. Therefore, using QPS table 300, controller processor 220 will determine which queue or queues have medium priority. It also determines which entry under column 2 should be serviced first by reading the next row number in R0C2. In table 300, next row number in R0C2 is 1 which means that the first entry to be serviced under column 2 (current priority) is the entry in R1C2 (row 1, column 2). Therefore, storage controller processor 220 next examines the sub-fields (queue number and next row number) in R1C2 which identify $Q_2$ as the queue to be serviced immediately and the next entry to be serviced as R1C2 which means all the requests from $Q_2$ have to be carried out before any other queue is serviced. Similarly, once all the queues having medium priority are serviced then Storage processor 220 begin servicing the queues in column 1 (low priority), if any, and after that it services the queues in column 0 (the lowest priority), if any.

In default QPS Table 300, $Q_0$ has the lowest priority (priority 0) as shown in R1C0. $Q_1$ has low priority (priority 1) as is shown in R1C1, $Q_2$ has medium priority (priority 2) as shown in R1C2, and $Q_3$ has the highest priority (priority 3) as shown in R1C3.

With reference to FIG. 3B, there is shown a depiction of a device controller and status (DCS) table 350 which is created by controller processor 220 once the default QPS table 300 is received by storage controller 211 from host 202. DCS table 350 includes priority level information for $Q_0$, $Q_1$, $Q_2$ and $Q_3$ which are determined by examining the default QPS table 300. The priority level information for each queue is stored in priority level column 354. DCS table 350 further includes number of requests currently pending in each queue which are stored in column 352. DCS table 350 also includes current priority level for queue servicing at which the storage controller is servicing the queues. In default DCS table 350, the default value for current priority level for queue servicing (CPLQS) is set at −1 as shown in column 354.

Figure 6:
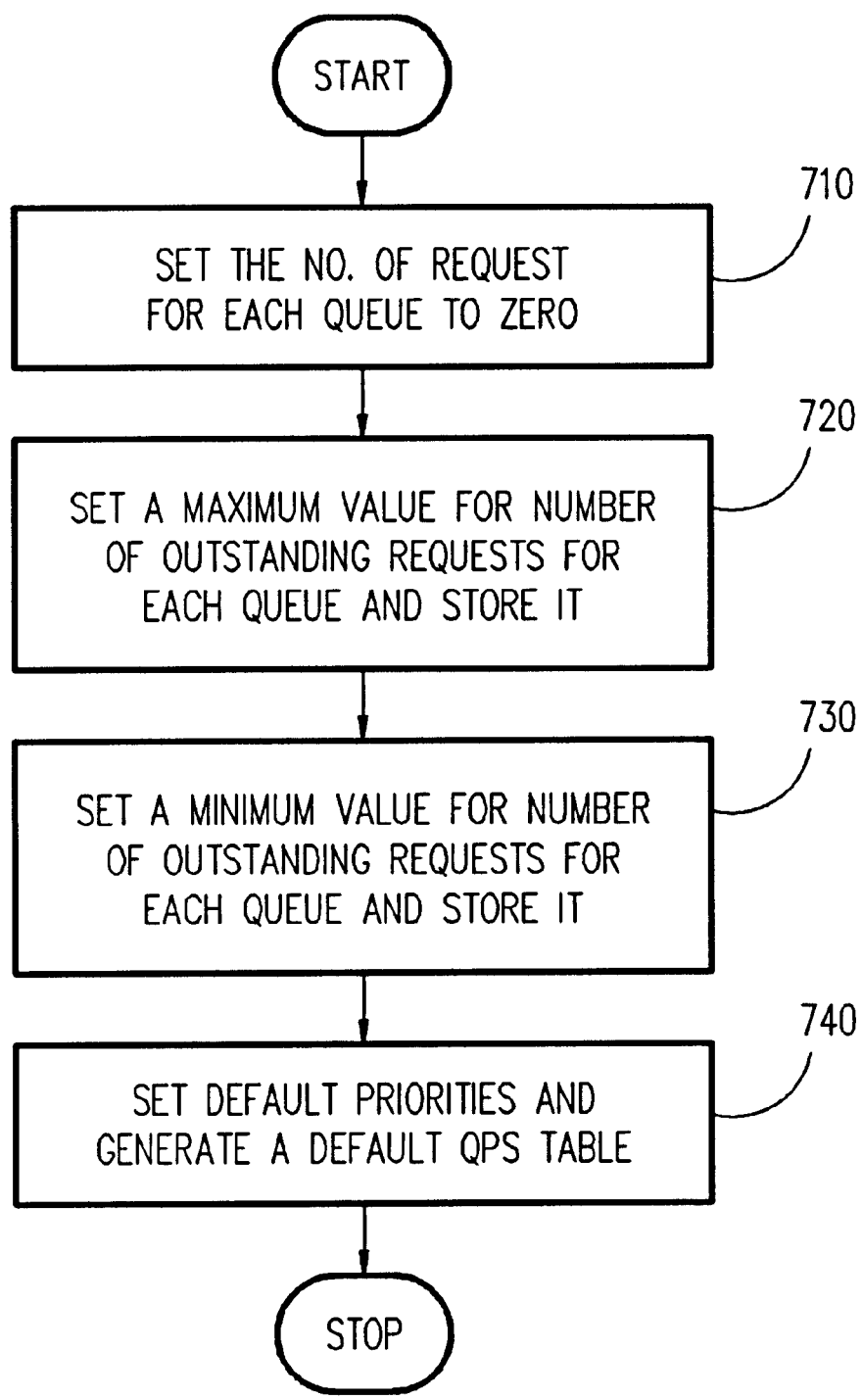
FIG. 6 is a flowchart of an initialization algorithm executed by the sender.

Now referring to FIG. 6, there is shown a flowchart of an initialization algorithm executed by host 202 in the preferred embodiment of the present invention.

Now referring generally to FIGS. 2, 3A, 3B and 6, host 202 begins by initializing the number of outstanding (pending) requests for each queue to 0 (block 710). It then sets a maximum request value for number of outstanding requests for each queue and stores that value in memory 208 (block 720). For example, host 202 may set the maximum request count of outstanding requests for $Q_2$ at five, for $Q_1$ at ten, and for $Q_0$ at twenty. Using these maximum request count, host processor 202 will generate a new QPS table if any of these maximum are exceeded. Host processor 202 also sets a minimum request count for number of outstanding requests for each queue and stores that value in memory 208 (block 730). When outstanding count for each queue drops below the corresponding minimum request count, host processor 202 resets the QPS table maintained in storage processor 211 back to its default value by transmitting the default table 300 to storage controller 211 (block 740). The initial table as shown in FIG. 3A, assigns the highest priority to $Q_3$, the medium priority to $Q_2$, the low priority to $Q_1$ and the lowest priority to $Q_0$.

Figure 7:
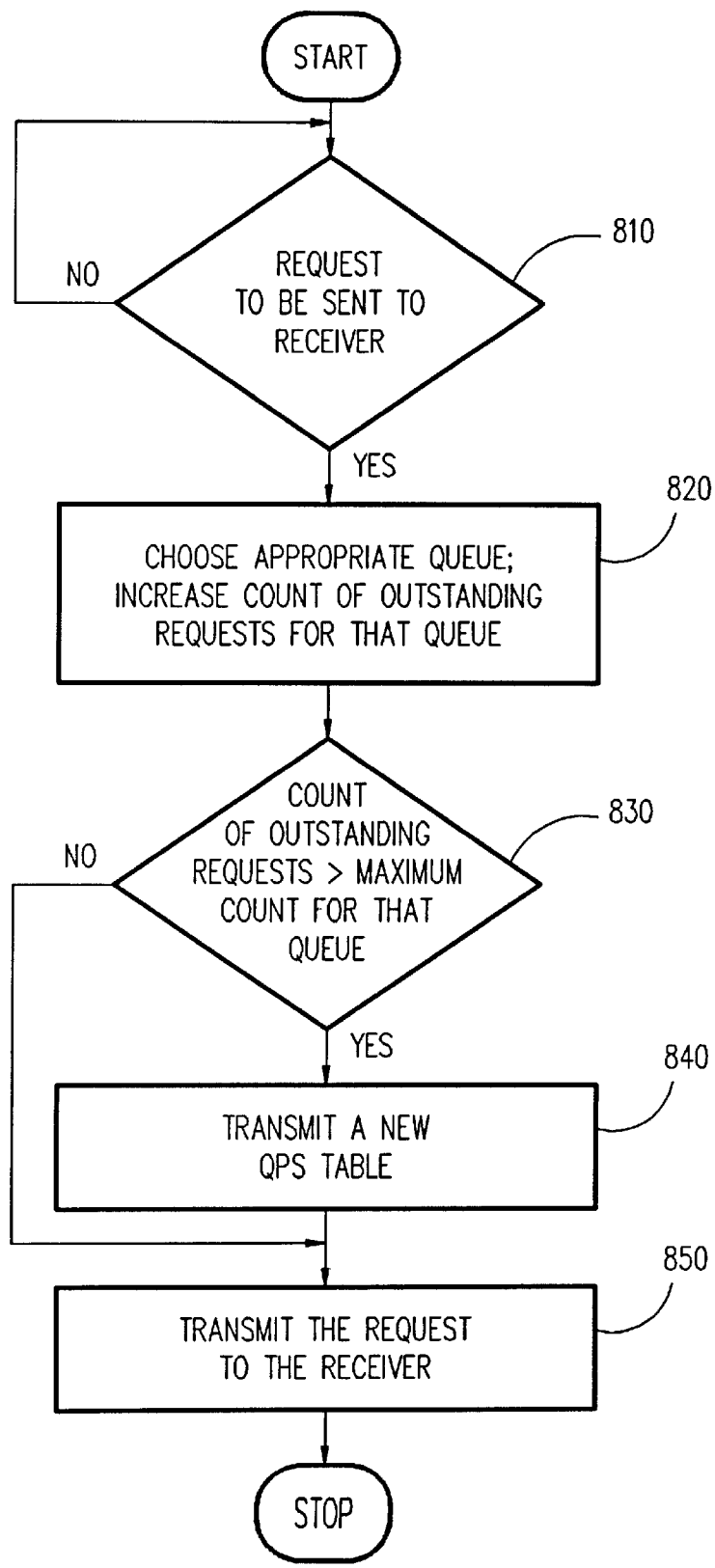
FIG. 7 is a flowchart of a request handling algorithm executed by the sender.

Referring now to FIG. 7, there is shown a flowchart for the request handling algorithm executed by host processor (sender) 202 in the preferred embodiment of the present invention. When a request for accessing data on any of storage devices 212 is generated by host 202, based on the priority assigned to that request, host 202 determines which $Q_i$ should handle that request (block 820). Host processor 202 also increases the count of outstanding requests for $Q_i$ (block 820). Host 202 then determines whether the count of outstanding requests has exceeded the maximum request count established for $Q_i$ (block 830). If the count of outstanding requests is less than the maximum request count established for $Q_i$, the request is transmitted to storage controller 211 for further processing (block 850). However, if the count of outstanding requests is greater than the maximum request count established for $Q_i$, host 202 generates a new (modified or updated) QPS table and transmits it to storage controller 211 (block 840). The modified QPS table sent to storage controller 211 has an increased priority for $Q_i$ allowing the requests in that queue to be processed much faster.

For example, if maximum requests count for $Q_1$ is set at twenty and the count of outstanding requests is at twenty-one, host processor 202 may send a new QPS table to storage controller 211 where the priority of $Q_1$ is raised to either priority three which is the highest priority or to priority two which is medium priority, thus allowing the faster processing of the requests in $Q_1$. As the requests in $Q_1$ are carried out, that information is communicated by storage controller 211 back to host 202 where host 202 will decrement the count of outstanding requests for $Q_1$. Once the outstanding count for $Q_1$ falls below a predetermined minimum request count, then host 202 will send the original QPS table back to storage controller 211 overriding the updated QPS table. In doing so, the priority of $Q_1$ which was raised to the highest priority three or medium priority two is set back to its initial value of low priority one.

Figure 8:
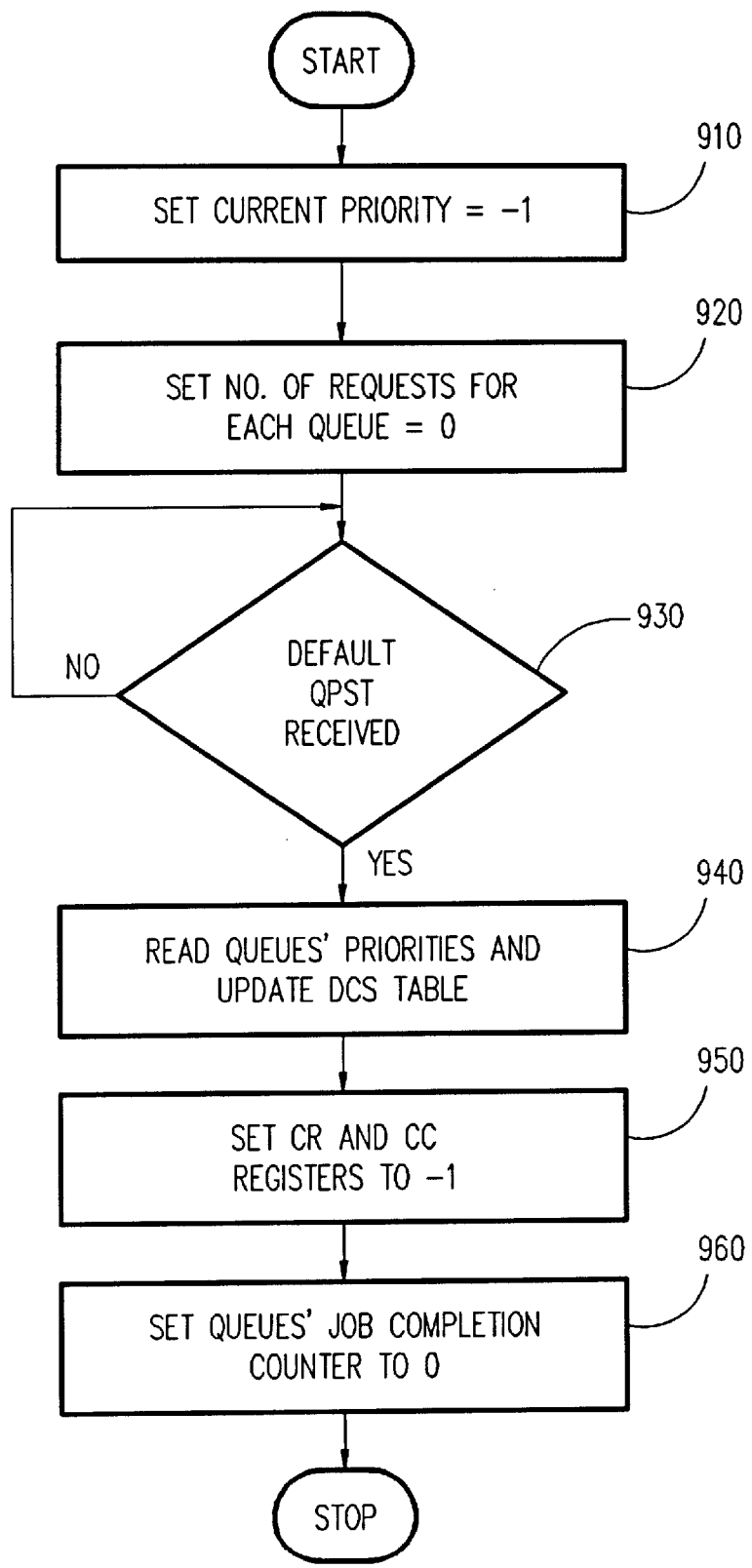
FIG. 8 is a flowchart of an initialization algorithm executed by the receiver to create a DCS Table.

With reference to FIG. 8, there is shown a flowchart of initialization algorithm executed by storage controller (receiver) 211 to initialize a queue management information for each storage device in storage subsystem 210. As mentioned earlier, queue management information comprises four queues, QPS table, device controller and status (DCS) table, queue job completion counter, current row (CR) and current column (CC) registers.

Now with reference to FIGS. 2, 3A, 3B and 8, storage controller 211 initially sets the current priority level for queue servicing to −1 (block 910). This will ensure that storage controller 211 will be interrupted by any requests received from host 202 since any requests received from host 202 has priority higher than −1. Storage controller 211 further sets number of requests initially pending in each queue to zero (block 920). Storage controller 211 then waits to receive the default QPS table 300 from host 202 (block 930). Once QPS table 300 is received, storage controller 211 determines the priority of each queue from table 300 and enters that information in DCS table 350 (block 940). Storage controller 211 then sets the current row (CR) register and current column (CC) register to −1. Once a request from a queue begins executing, the CR and CC will be set to the row and column in the QPS table identifying the queue from which the current request is being serviced. Storage controller 211 further sets the queues' job completion counter to zero (block 960).

Figure 9A:
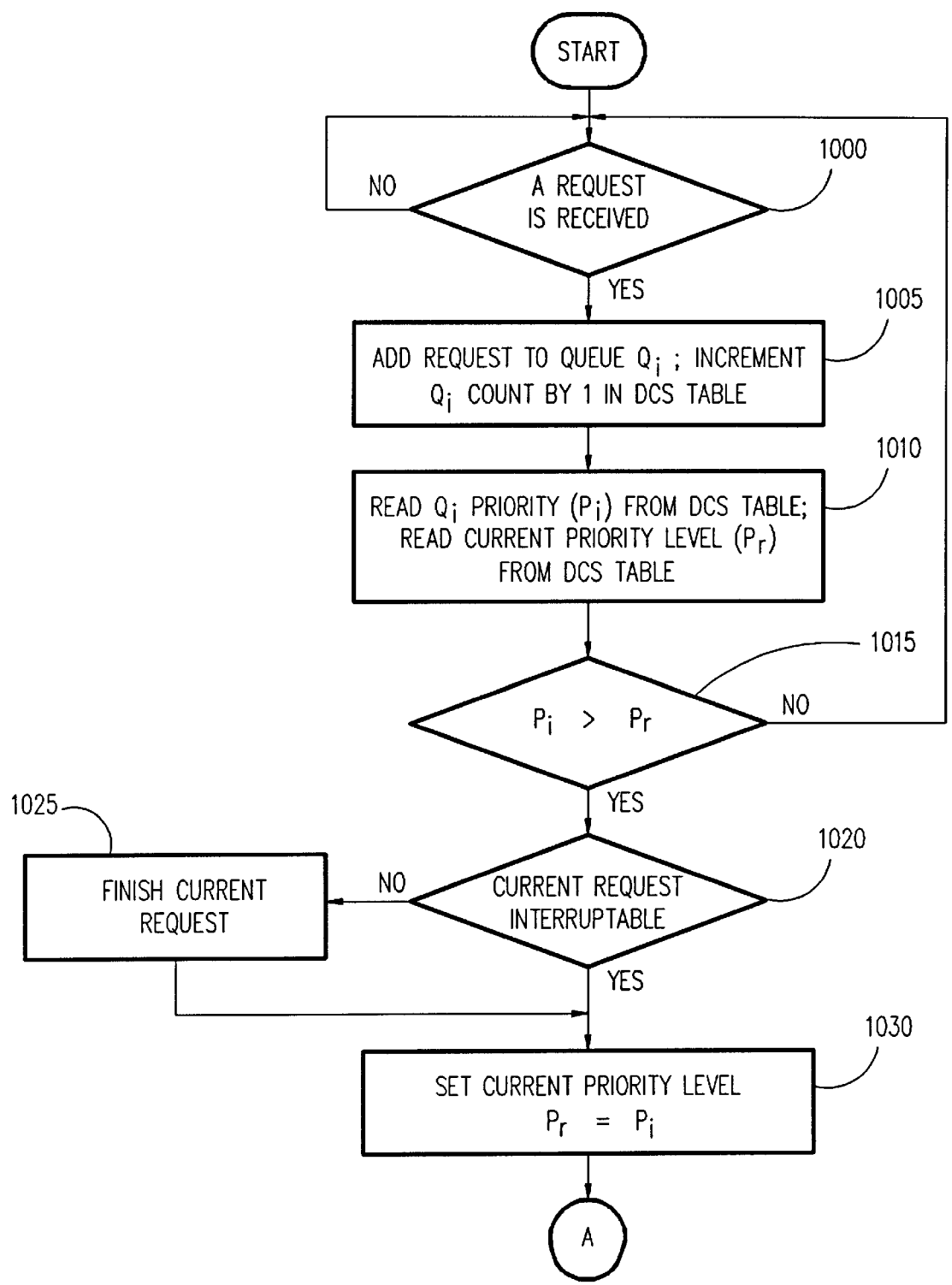
FIGS. 9A and 9B are a flowchart of an execution algorithm executed by the receiver when a request is received.
Figure 9B:
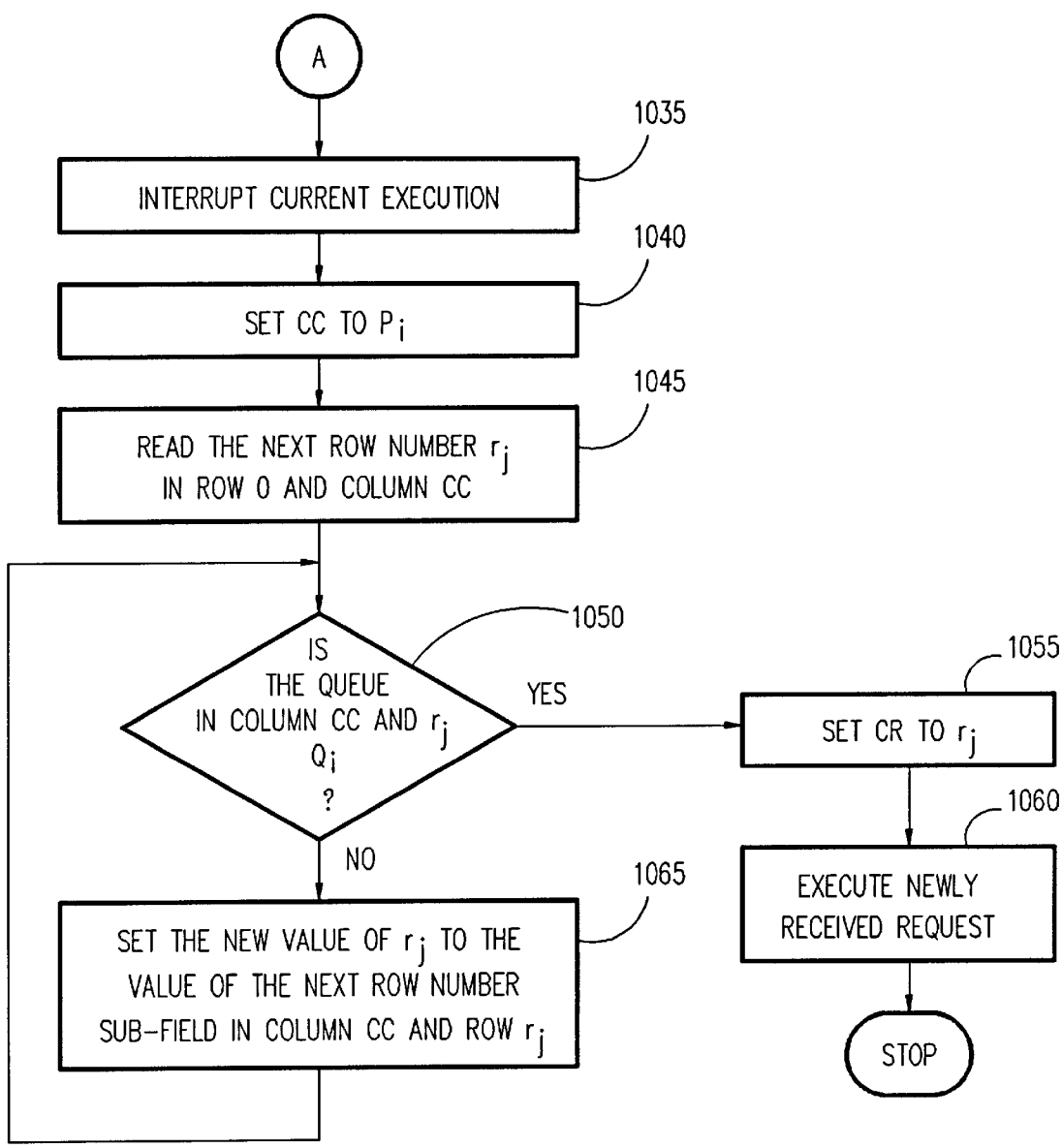

With reference to FIGS. 9a and 9b, there is shown a flowchart of the execution algorithm carried out by storage controller 211 when a request for accessing a storage device is received. Referring generally to FIGS. 2 and 9, when storage controller 211 receives a request for access to a storage device (block 1000), it adds that request to a particular queue $Q_i$ and increases the count for the number of requests in $Q_i$ by one in the corresponding DCS table (block 1005). Next, storage controller 211 reads the current priority ($P_i$) of $Q_i$ from the corresponding DCS table and the current priority level $P_r$ at which the queues are being serviced (block 1010). Storage controller 211 then determines whether $P_i$ is greater than or less than or equal to $P_r$. If $P_i$ is less than or equal to $P_r$, storage controller 211 continues with the execution of the current request. If $P_i$ is greater than $P_r$ as depicted by block 1015, storage controller 211 determines whether the current request that is being executed is interruptible (block 1020). If the current request is not interruptible, storage controller 211 finishes the current request before executing a newly received request (block 1025).

If the current request is interruptible, the current priority level in DCS Table is set at $P_r=P_i$ (block 1030), the execution of the current request is interrupted (block 1035), and the content of CC register is set to $P_i$ (block 1040). Next, in order to determine the content of current row register, the next row number $r_j$ in row 0 of column CC is read by storage controller 211 (block 1045). If the queue in the entry identified by row $r_j$ and column CC is $Q_i$, then the content of current register (CR) is set to $r_j$ (block 1055) and the newly received request is executed (block 1060). On the other hand, if the queue in the entry identified by row $r_j$ and column CC is not $Q_i$, storage controller 211 sets new value of $r_j$ to the value of the next row number in the entry in row $r_j$ and column CC (bock 1065) and then determines whether the queue in the entry identified by new row number and column CC is $Q_i$ (block 1050). This procedure is carried out until the appropriate row under column CC where the $Q_i$ entry is located is found. Once $Q_i$ is located, the content of CR is set to the value of the row where $Q_i$ is located and the newly received request is executed.

Figure 10A:
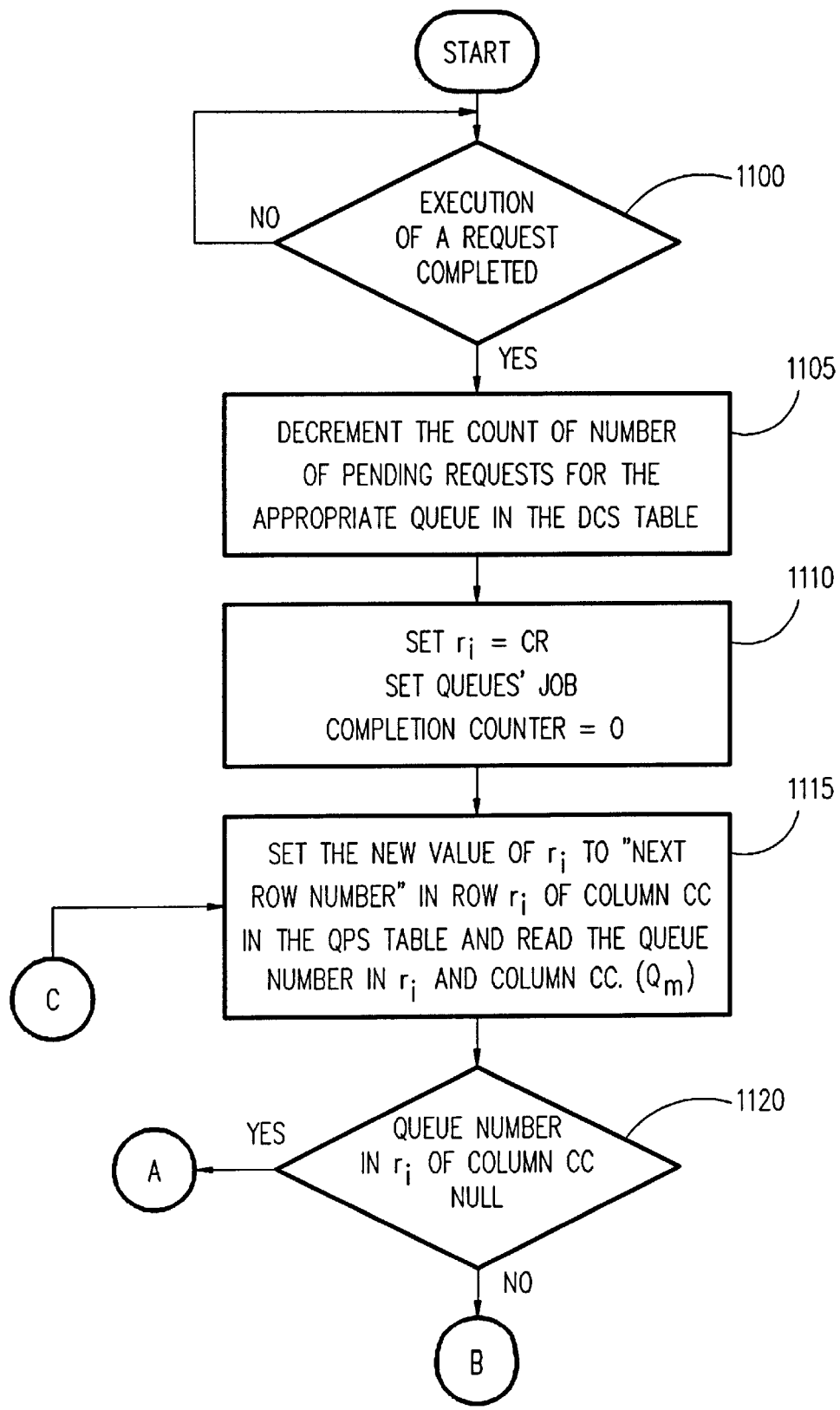
FIGS. 10A and 10B are a flowchart of an execution algorithm executed by the receiver to determine which request should be executed next.
Figure 10B:
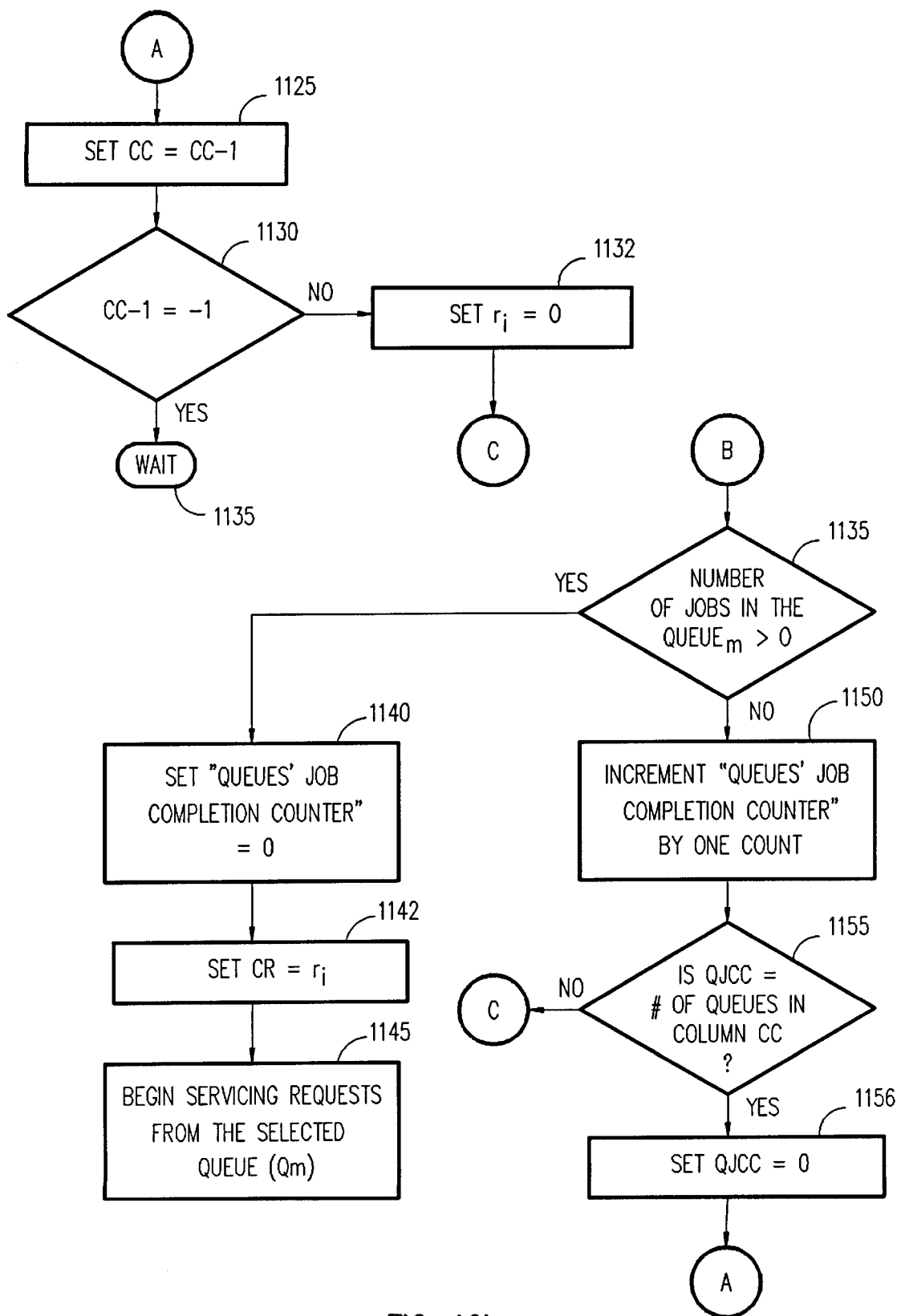

With reference to FIGS. 10a and 10b, there is shown a flowchart for the algorithm carried out by storage controller 211 to determine which request should be executed next from the QPS table for a storage device. Now referring generally to FIGS. 2 and 11, when the execution of a request is completed (block 1100), storage controller 211 decrements the count of pending requests for the appropriate queue in the corresponding DCS table (block 1105). The storage controller also sets $r_r=CR$ and queues' job completion counter to zero (block 1110). Storage controller 211 then determines the row and column in the QPS table which identify the queue that should be serviced next and stores the row and column information in registers CR and CC in the following way. Assuming that the current row is row r, the next row number in row r of column CC in QPS table is read to determine what is the next row in column CC that should be serviced. Assuming that the next row is row $r_i$, the queue number in row $r_i$ is then read to determine what is the next queue, $Q_m$, from which requests should be serviced (block 1115). If the queue number in row $r_i$ of column CC is null, which means there are no requests in this queue at this priority level, the storage controller will begin servicing queues at the next lower priority level in column CC=CC−1 (block 1125). If CC=CC−1 is equal to −1, there are no more requests to be executed and storage controller 211 waits until new requests are received (blocks 1130, 1135, and 1100). If CC=CC−1 is not equal to −1, storage controller 211 sets $r_i$=0 (block 1132), then in order to determine which queue in column CC=CC−1 should be serviced first, storage controller 211 reads the next row number in row 0 of the column CC=CC−1 and services the queue identified by row 0 and CC=CC−1 (block 1115).

Referring back to block 1120, if the queue number in row $r_i$ of column CC is not null (block 1120) and the number of requests for that queue, $Q_m$, is larger than zero (block 1135), the queues' job completion counter is set to zero (block 1140), CR is set to $r_i$, and storage controller 211 begins servicing the request from $Q_m$ (block 1145). However, if the number of requests for $Q_m$ in row $r_i$ is also at zero, the queues' job completion counter is incremented by one count (1150) and storage controller 211 determines whether the content of the queues' job completion counter is equal to number of queues in column CC of the QPS table (block 1155). If they are equal, storage controller 211 sets the content of queues' job completion counter to zero (block 1156) and begins servicing queues at the next lower priority level in column CC=CC−1 as described previously (block 1125).

Referring back to block 1155, if the content of the queues' job completion counter is not equal to the number of queues in column CC (block 1150), the next row number in row $r_i$ of column CC is used to locate the next queue that should be serviced as described previously (block 1115).

With reference to FIG. 4A, there is shown an example of a QPS table 400 transmitted by host 202 to storage controller 211 where the priority of $Q_0$ has been modified. According to table 400, $Q_3$ has the highest priority, $Q_1$ has low priority, there is no lowest priority queue and $Q_0$ and $Q_2$ both have medium priority.

FIG. 4B is a depiction of a DCS table 450 associated with QPS Table 400. Referring to DCS Table 450, it is shown that the number of requests in $Q_0$ is currently at 15. Assuming that the maximum number of requests allowed in $Q_0$ is ten, this means there are five more requests in $Q_0$ for execution than are normally allowed. As a result, host 202 sends QPS table 400 to storage controller 211 through which the priority of $Q_0$ is raised from lowest priority to medium priority, thus allowing faster execution of the request in $Q_0$ by storage controller 211. Referring back to QPS table 400 and DCS table 450, since there are no requests in $Q_3$, the next request to be executed comes from column 2 having medium priority. Storage controller determines which queue should be serviced first in column 2 by reading the next row number in R0C2. The next row number in R0C2 is 2 which means $Q_0$ is the first queue that should be serviced under current priority level. Once a request from $Q_0$ is serviced, then the next row number in entry R2C2 is read to determine what is the next queue at the current priority level that should be examined. According to QPS Table 400, the next row number in entry R2C2 is 1 which means $Q_2$ is the next queue that should be serviced. However, based on DCS table 450, there are no pending requests in $Q_2$. Therefore, based on the next row number in entry R1C2, storage controller 211 services another request from $Q_0$. Storage controller 211 repeatedly toggles between $Q_0$ and $Q_2$ and executes requests from $Q_0$ until $Q_0$ becomes empty or falls below a predetermined minimum request count. Once $Q_0$ is empty or falls below a predetermined minimum request count, that information is communicated back from storage controller 211 to host 202. The host 202 then sends the original QPS Table back to storage controller 211 overriding table 400.

FIG. 5A is an example of another modified QPS table 500. FIG. 5B is a DCS table 550 associated with modified QPS table 500. As shown in this example, $Q_3$ has the highest priority and $Q_0$, $Q_1$ and $Q_2$ all have medium priority and there is no low or lowest priority queues. Referring to DCS table 550, it is shown that there are fifteen requests in $Q_0$, fifteen requests in $Q_1$, and four requests in $Q_2$. There are no pending requests in $Q_3$. According to DCS table 550, the current priority level for queue servicing is two. Therefore, Storage controller 211 begins servicing the queues in column 2 by first reading the entry R0C2 to determine the first queue that should be serviced. Since the next row number in entry R0C2 is two, storage controller services a request from $Q_1$ first followed by servicing a request from $Q_0$ followed by servicing two requests consecutively from $Q_1$ and then services one request from $Q_2$. As mentioned above, the order of queue servicing is determined by the next row number sub-field in each entry in column 2. The storage controller, using the next row number in each entry, repeatedly executes requests from $Q_1$, $Q_0$, $Q_1$, $Q_1$ and $Q_2$ until the number of requests in queues $Q_0$ and $Q_1$ fall below their respective predetermined minimum request count. Once the number of requests in $Q_0$ and $Q_1$ fall below the respective predetermined minimum request count, that information is communicated back to host 202 which in turn transmits the default table or another modified table back to the storage controller 211 overriding QPS Table 500. Note that using QPS table 500, the requests from $Q_1$ are serviced more frequently than the requests from $Q_0$ and $Q_2$. Therefore, although $Q_0$, $Q_1$, and $Q_2$ are all at priority level two, host 202 may send a QPS table which not only raises the priority of one or more queues, but in a given priority level allows one or more queues to be serviced more frequently than other queues at the same priority level.

Figure 11A:
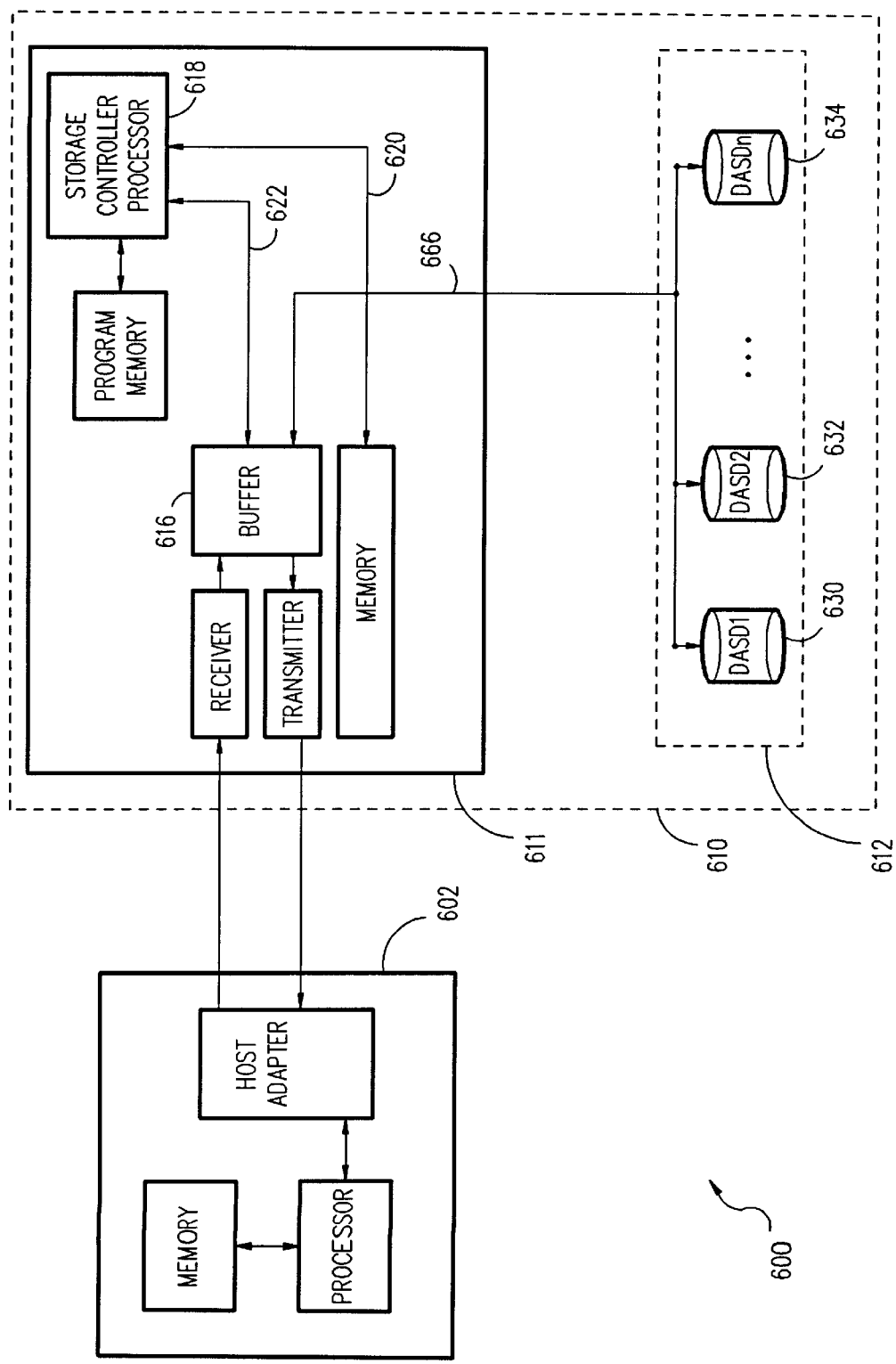
FIG. 11A is a depiction of an alternative embodiment of the present invention; and, FIG. 11B is a depiction of a direct access storage device (DASD) shown in FIG. 11A.
Figure 11B:
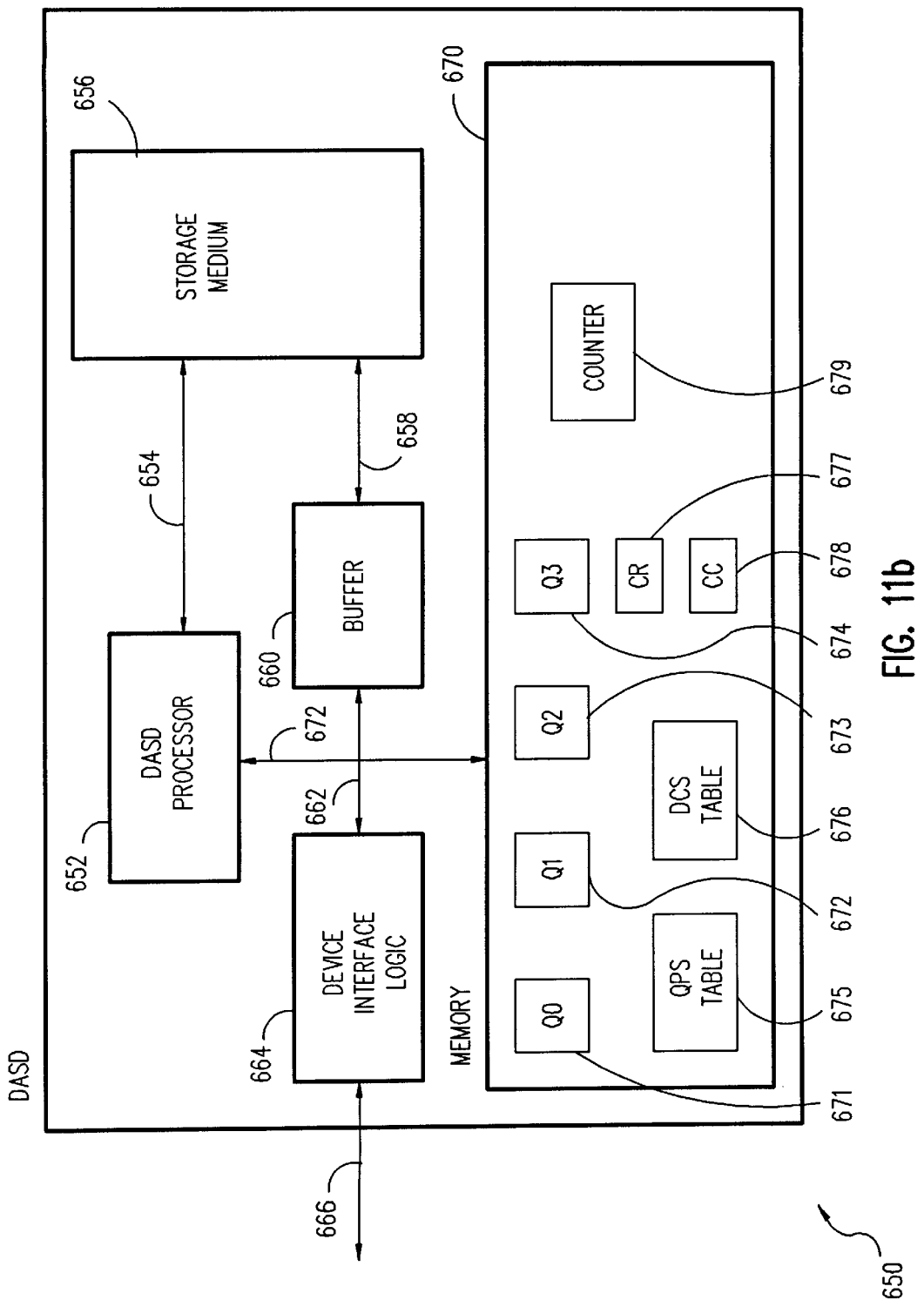

With reference to FIGS. 11A and 11B, there is shown an alternative embodiment of the present invention. In this embodiment comprising host 602 and storage subsystem 610, queues and relevant information are maintained at each device level, as shown in FIG. 11B, as opposed to being maintained at the storage controller level. In this embodiment, storage subsystem 610 comprises storage controller (sender) 611 and a plurality of storage devices (receiver) 612. Storage devices 612 communicate with storage controller 611 via communication channel 666. In this embodiment, storage controller 611 sets the maximum count for each queue, the minimum request count for each queue and generates the default QPS table and modified QPS table as necessary. This information is communicated from storage controller 611 via communication channel 666 to each and every storage device.

As shown in FIG. 11B, a typical storage device 650 comprises storage processor 652 communicating with storage medium 656 via link 654. Storage medium 656 communicates with buffer 660 via link 658. Buffer 660 is connected to device interface logic 664 via link 662. Device interface logic could be, for example, an SCSI (small computer system interface) or an SSA (serial storage architecture) type interface. DASD processor 652 communicates with memory unit 670 via link 672. Memory unit 670 stores the queues and relevant information such as the QPS table, DCS table, current row, current column, and queues' job completion counter. Request handling, queue servicing and priority handling is carried out in the same fashion as was done under the preferred embodiment of the present invention.

A number of embodiments of the present invention have been described. Nevertheless, it will be understood that various modifications may be made without departing from the spirit and the scope of the invention. For example, the priority of a queue for servicing may be dynamically adjusted when the average response time for servicing that queue exceeds a predetermined time value. Also, the maximum request count and minimum request count for each queue can be maintained at the receiver as opposed to the sender. This implementation trades saving storage space at the sender for more frequent interrupts issued by the receiver. Or, although, in the preferred embodiment of the present invention only four queues are shown to be associated with each storage device, it would be obvious to those skilled in the art that a higher or lower number of queues may be utilized. Furthermore, it would also be obvious to those skilled in the art that a priority of any queue, including the highest priority queue or queues, can be raised or lowered using the invention disclosed herein. Accordingly, it is to be understood that the invention is not to be limited by the specific illustrated embodiments, but only by the scope of the appended claims.

We claim:

1. In a data processing system, comprising a processor, a storage device, and a plurality of queues for servicing requests, a method for dynamically adjusting a queue priority, comprising the steps of:

defining a maximum count for each queue;

calculating, when a request is added to a queue, whether the number of requests in said queue is greater than the maximum count for said queue;

raising the priority of said queue to a higher priority if the number of requests in said queue is greater than the maximum count for said queue; and servicing a predetermined number of requests, less than the maximum count, in said queue before servicing a request from another queue having said higher priority.

2. A method according to claim 1 wherein said queue is stored in the processor.

3. A method according to claim 1 wherein said queue is stored in the storage device.

4. A data processing system, comprising:

a host;

a storage subsystem in communication with said host, said storage subsystem comprising:
a storage controller, and
a plurality of storage devices;

a plurality of queues maintained in said storage controller for servicing requests received from said host; and a processor for raising the priority of a queue to a higher priority if the number of requests in said queue is greater than a maximum count, said processor servicing a predetermined number of requests, less than said maximum count, in said queue before servicing a request from another queue having said higher priority.

5. A data processing system, comprising:

a host;

a storage subsystem in communication with said host, said storage subsystem comprising:
a storage controller, and
a plurality of storage devices;

a plurality of queues maintained in said plurality of storage devices for servicing requests received from said storage controller; and a processor for raising the priority of a queue to a higher priority if the number of requests in said queue is greater than a maximum count, said processor servicing a predetermined number of requests, less than said maximum count, in said queue before servicing a request from another queue having said higher priority.

* * * * *